United States Patent [19]

Andresen et al.

[11] Patent Number: 4,728,921
[45] Date of Patent: Mar. 1, 1988

[54] POSITION INDICATOR FOR AN ACTUATING DRIVE

[75] Inventors: Jens N. Andresen, Sonderborg; Kjeld Hellegaard, Bjerringbro, both of Denmark

[73] Assignee: Danfoss A/S, Nordborg, Denmark

[21] Appl. No.: 850,006

[22] Filed: Apr. 10, 1986

[30] Foreign Application Priority Data

Apr. 18, 1985 [DE] Fed. Rep. of Germany ....... 3513561

[51] Int. Cl.$^4$ .............................................. H01C 10/00
[52] U.S. Cl. ..................................... 338/196; 338/137; 338/172; 338/171
[58] Field of Search ............... 338/196, 174, 199, 164, 338/163, 137, 172, 171, 191, 198

[56] References Cited

U.S. PATENT DOCUMENTS 2,490,458 12/1949 Feldhausen ..................... 338/191 X
2,883,499 4/1959 Kilby et al. ......................... 338/137

FOREIGN PATENT DOCUMENTS 2417081 10/1979 France ................................. 338/196
1279312 6/1982 United Kingdom .
221794 10/1968 U.S.S.R. ............................... 338/196

*Primary Examiner*—E. A. Goldberg
*Assistant Examiner*—Marvin M. Lateef
*Attorney, Agent, or Firm*—Wayne B. Easton

[57] ABSTRACT

A position indicator for an actuating drive device which has a range of positions and includes a potentiometer having a resistance strip with end connectors at opposite ends thereof. A tapping feature includes two independently moveable arms each connected at one end thereof to a moveable part of the drive device and at the other end thereof to the resistance strip in sliding engagement therewith and bridging a section of the resistance strip therebetween. The arms are initially adjustable to the end limiting positions of the drive device.

3 Claims, 4 Drawing Figures

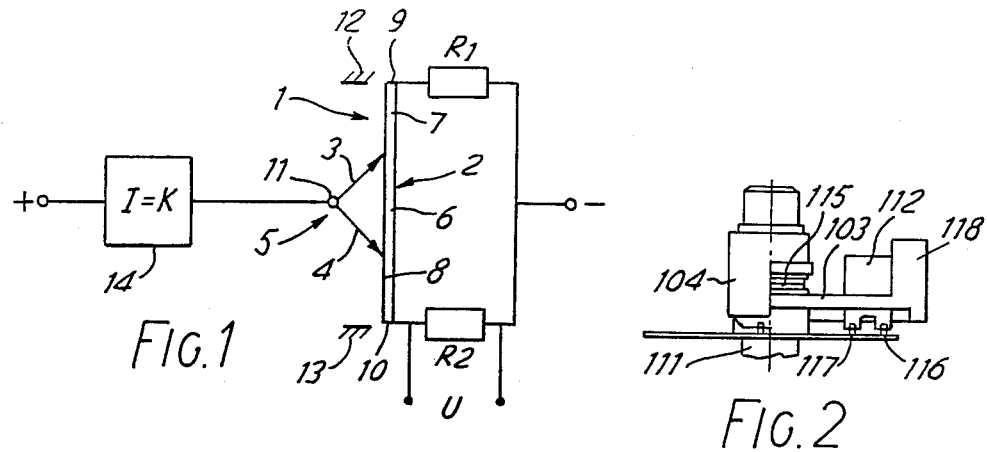
FIG.1
FIG.2
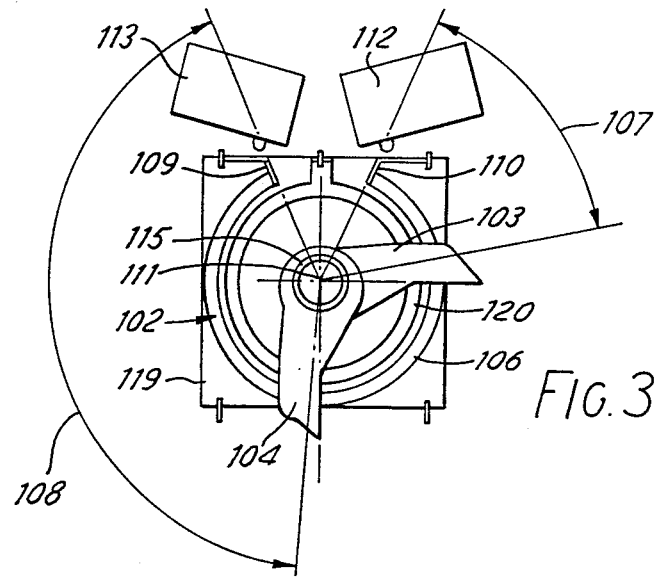
FIG.3
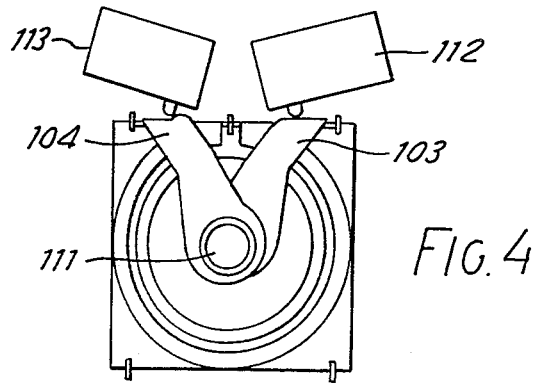
FIG.4

POSITION INDICATOR FOR AN ACTUATING DRIVE

STATEMENT OF THE INVENTION

The invention relates to a position indicator for an actuating drive, comprising a potentiometer of which the tapping is connected to one of the relatively movable actuating drive parts and the resistor is connected to the other, adjusting means being provided to adapt the potentiometer to the limiting positions of the actuating drive.

PRIOR ART

In a known position indicator of this kind (U.S. Pat. No. 3,585,561), the resistor consists of a helical spring wire coil of which the end connectors are adjustable on a track so that the limiting positions of the actuating drive can be taken into account. These limiting positions are either constructionally provided at the motor component or determined by the driven member, for example a valve, a flap or the like. The end connectors are held in a clamping apparatus and, after the clamping is released, can be manually displaced. With an output element of the actuating drive that is rectilinearly movable, the resistor is straight and, with a rotatable output shaft, it is concentric to this shaft. It is also known to associate the end connectors with lugs by which they can come into contact with a limiting switch in the limiting positions of the actuating drive. For many applications, however, a spring wire coil is not suitable. In addition, it is expensive, as is the associated clamping apparatus. Another position indicator for an actuating drive is known (British Pat. No. 1,279,312), in which a fixed resistor is provided on which the two end connectors are displaceable. The displacement can take place with the aid of the tapping connected to the output element of the actuating drive. Instead, only the one end connector and consequently the entire resistor may be mounted for displacement. In every case, three parts must be movable, namely the two connectors and the tapping or one end connector, the tapping and the resistor. This is expensive.

STATEMENT OF PROBLEM

The invention is based on the problem of providing a position indicator of the aforementioned kind in which no spring wire coil is necessary and the cost is low.

BACKGROUND OF THE INVENTION

This problem is solved according to the invention in that the resistor has a fixed length and extends between two end connectors fixed thereto and that the tapping consists of two relatively adjustable arms which electrically bridge the resistor section therebetween.

In this case, a resistor of fixed length can be used, for example in the form of a resistor track of thick film. Since the end connectors are fixed, a good electrical connection is obtained. The end connectors may also be provided on a plate. By using the two arms, the resistor section bridged thereby becomes ineffective. The two effective resistor sections accurately correspond to the displacement of the actuating drive. The expense is low because the resistor can be fixed to the one actuating drive part and only the tapping has to be duplicated. It is particularly favourable if abutments for the arms are provided in the region of the end connectors and these are connected by way of a slip clutch to the associated actuating drive part. When the actuating drive is on first operation successively moved to its two limiting positions, the arms are automatically brought into their correct relative position by the abutments.

The abutments may be formed by limiting switches. They can serve to switch the actuating drive off in the limiting positions so that overloading is avoided.

In a preferred embodiment, with an actuating drive having a rotatable output shaft the arms are rotatably displaceably secured thereon and the resistor is fixed on a circle concentric with the output shaft. In this case, the resistor may be secured to the part of the actuating drive that is fixed with respect to the housing. The output shaft need merely be provided with the two arms.

The arms may be resiliently clamped onto the output shaft. They will slide on the output shaft when, on first operation, they are pressed by the actuating drive against the associated abutment.

It is also favourable if a short-circuit track is provided concentric with the resistor, both arms being in electrical contact with the track. By means of this short-circuit track, one ensures that the resistor section between the arms is indeed short-circuited and the measurement will not include any resistances in the region of the clip clutch. Further, the contact arms may even be electrically insulated from the output shaft and, for example, be of plastics material except for the electric contacts.

The measurement will be particularly accurate if the two resistor sections extending between each arm and each end connector are each in series with a drop resistor, both series circuits are connected in parallel and the parallel circuit is in series with a source of constant current, and a measuring voltage can be derived at one of the drop resistors. By reason of the subdivision into two parallel branches of which the resistance is altered in opposite senses, compartively large changes are obtained in the measuring voltage.

In this construction it is advisable for the drop resistors to be much smaller than the potentiometer resistor.

DESCRIPTION OF THE DRAWING

A preferred example of the invention will now be described in more detail with reference to the drawing, wherein:

FIG. 1 is a diagrammatic illustration of a position indicator according to the invention, FIG. 2 is a side elevation of a different example, FIG. 3 is a plan view of the FIG. 2 embodiment in the normal operating position, and FIG. 4 is a plan view similar to FIG. 3 prior to operation.

FIG. 1 shows a potentiometer 1 having a straight resistor 2 and a tapping 5 consisting of two arms 3 and 4. In this way, the resistor 2 is sub divided into a bridged portion 6 and two effective portions 7 and 8. The ends of the resistor 2 are provided with fixed connectors 9 and 10.

DESCRIPTION OF THE PREFERRED EMBODIMENT

The tapping 5 is connected to the output element 11 of an actuating drive and is displaceable parallel to the resistor 2. Stationary abutments 12 and 13 which can co-operate with the arms 3 and 4 are provided near the end connectors. Before the first time of use, the arms 3 and 4 have the largest possible spacing from each other.

If the actuating drive is moved to the upper limiting position, the arm 3 strikes the abutment 12 and is adjusted on the output element 11. If the actuating drive subsequently moves to its lower position, the abutment 13 co-operates with the arm 4 so that the latter is adjusted on the output element 11. In the end, the arms 3 and 4 have the illustrated position.

The effective resistor section 7 is in series with a drop resistor R1 and the effective resistor section 8 in series with a drop resistor R2. The two series circuits are in parallel and connected in series with a constant current generator 14. The drop resistor R2 serves as a measuring resistor at which a position-defining measuring voltage V can be derived. Since the current proportions in the two branches of the parallel circuit change in opposite senses upon alteration in the position of the output element 11, comparatively large changes in the measuring voltage V can be obtained for small changes in the length of the actuating drive.

In the embodiment of FIGS. 2 to 4, corresponding parts bear reference numerals increased by 100. Two arms 103 and 104 are held on a rotatable output shaft 111 by way of a slip clutch 115. The arm 103 carries two inter connected slide contacts 116 and 117 as well as a lug 118. The arm 104 is of the same construction.

, A resistor track 102 consisting of a thick layer is applied to a carrier 119 which is connected to part of the actuating drive that is fixed with respect to the housing. Concentric within the resistor track 106 there is a short circuit track 120. The two slide contacts 116 and 117 are in contact with the resistor track 106 or the short-circuit track 120, rspectively. The two end connectors 109 and 110 are fixed to the carrier 119. Near these end connectors there are two limiting switches 112 and 113, for example micro switches, which also serve as end abutments. These limiting switches are likewise connected to part of the actuating drive that is fixed with respect to the housing.

FIG. 4 shows the positions of the arms 103 and 104 upon commencement, i.e. before first being put into operation. If, now, the actuating drive is operated so that the output shaft 111 is turned anti-clockwise, the arm 103 is retained by making use of the slip clutch whereas the arm 104 is carried along to the limiting position of FIG. 3. If, now, the actuating drive is operated in the opposite direction, the arm 103 is carried along. The arm 104 first returns to its starting position and is then held there until the arm 103 has reached its limiting position. Two effective resistor sections 107 and 108 are produced of which the sum is equal to the entire displacement path.

The two arms 103 and 104 consist of plastics material and are frictionally placed on the metal output shaft 111.

The carrier 119 could also be connected to the output shaft and the arms 103 and 104 fixed with respect to the housing.

We claim:

1. A position indicating potentionmeter, comprising, a base member, a position indicating shaft rotatably mounted on said base member, an arc shaped resistance track surrounding said shaft and having end connectors, first and second abutment means at the respective ends of said track, first and second arms connected to said shaft and being in sliding electrical contact with said track, and slip clutch means respectively between said arms and said shaft to allow said arms to be carried by said shaft and to allow respective displacement of said arms relative to said shaft when said shaft moves said arms into respective engagement with said abutment means, said shaft having an angular displacement relative to said base member depending on the adjusted position of said arms relative to said shaft.

2. A position indicating potentiometer according to claim 1 including switches associated with said abutment means to provide for switching off in the limiting position of said arms.

3. A position indicating potentiometer according to claim 1 including a short-circuit track arranged concentric to said resistance track and being in electrical contact with both of said arms.

* * * * *